United States Patent [19]

Cubalchini

[11] 4,168,908
[45] Sep. 25, 1979

[54] PRECISION POINTING AND TRACKING CONTROL SYSTEM

[75] Inventor: Ronald Cubalchini, Santa Monica, Calif.

[73] Assignee: The United States of America as represented by the Secretary of the Air Force, Washington, D.C.

[21] Appl. No.: 866,189

[22] Filed: Dec. 30, 1977

[51] Int. Cl.$^2$ ............................................. G01B 11/26
[52] U.S. Cl. ............................... 356/152; 250/203 R; 356/363
[58] Field of Search ............... 356/141, 152, 356, 358, 356/363; 250/203 R

[56] References Cited

U.S. PATENT DOCUMENTS

| 4,102,572 | 7/1978 | O'Meara | 356/152 |
| 4,140,398 | 2/1979 | Hodder | 356/152 |

*Primary Examiner*—S. C. Buczinski
*Attorney, Agent, or Firm*—Joseph E. Rusz; Jacob N. Erlich

[57] ABSTRACT

A precision pointing and tracking control system having a source for producing an electromagnetic beam, a high efficiency diffraction grating, a retroreflector, sensor and means for adjusting the optical relationship between the above elements and a target. The diffraction grating diffracts a large portion of an incident narrow spectral band or monochromatic beam into a single (non-zero) diffraction order in conjunction with the retroreflector as a means of (1) sampling the input narrow band or monochromatic beam, and (2) collecting any radiated electromagnetic energy coming from the direction of propagation (i.e., from the target or receiver). By maintaining a proper relationship between target and source radiation, precision pointing and tracking of the target by the beam produced from the source can be easily accomplished.

10 Claims, 1 Drawing Figure

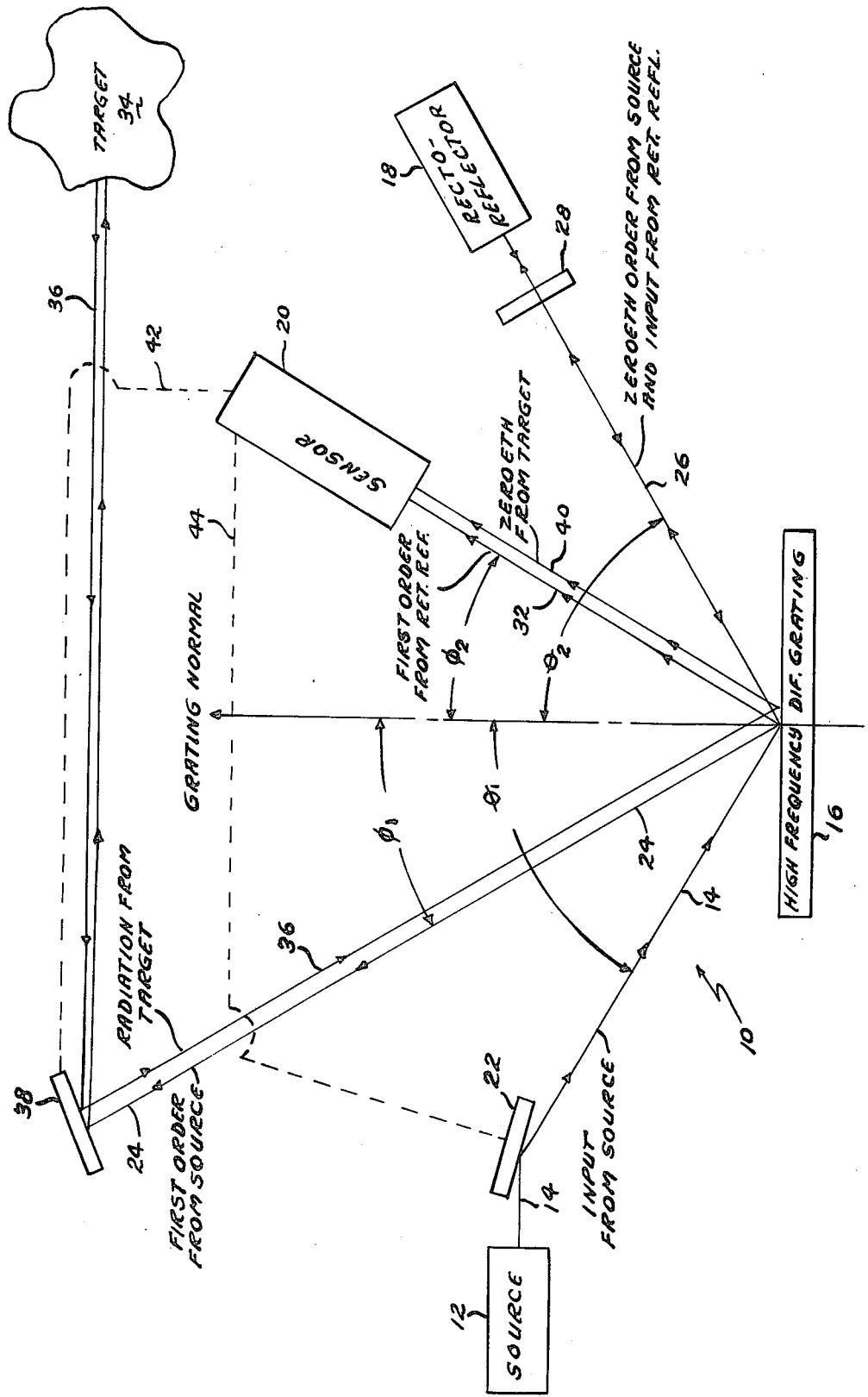

PRECISION POINTING AND TRACKING CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to tracking systems, and, more particularly, to a control system capable of precision pointing of a laser beam.

Light amplification by stimulated emission of radiation (laser) has extended the range of controlled electromagnetic radiation to the infrared and visible light spectrum. A laser produces a beam of coherent electromagnetic radiation having a particular well-defined frequency in that region of the spectrum broadly described as optical. This range includes the near ultraviolet, the visible and the infrared. The coherence of the beam is particularly important because it is that property which distinguishes laser radiation from ordinary optical beams. On account of its coherence, a laser beam has remarkable properties which set it apart from ordinary light which is incoherent.

Coherence, is of two kinds: spatial and temporal. A wave is spatially coherent over a time interval if there exists a surface over which the phase of the wave is the same (or is correlated) at all points. A wave is time-coherent at an infinitesimal area on a receiving surface if there exists a periodic relationship between its amplitude an any one instant and its amplitude at later instants of time. Perfect time coherence is an ideal since it implies perfect monochromaticity, something which is forbidden by the uncertainty principle.

Laser beams have a number of remarkable properties. Because of their spatial coherence, they have an extremely small divergence and are therefore highly directional. A laser beam, because it possesses space coherence, can be focused to form a spot whose diameter is of the order of one wavelength of the laser light itself. Enormous power densities are thus attainable.

The most promising potential of lasers comes from time coherence. It is this property which permits exploitation of radio and microwaves for communications. However, laser frequencies are millions of times higher than radio frequencies, and hence are capable of carrying up to millions of times more information. In fact, one single laser beam has in principle more information carrying capicity than all the combined radio and microwave frequencies in use at the present time.

Accordingly, systems applications of lasers are useful for communication in space, on earth and undersea, as well as surveillance and weapons systems.

In many applications it is desirable to direct a laser beam at a moving object. In the prior art, moving objects were tracked by moving a telescope or other optical elements external to the laser in a manner causing the generated laser beam to follow the object. Such systems required considerable equipment in order to monitor the motion of the object and control the movable optical element accordingly. Furthermore, previous systems have used separate sampling and sensing elements; one to sample and sense the laser beam, and one to separate and sense the energy coming from the target and from the outgoing laser beam. Since samplers are generally optical elements having high loss characteristics, elimination of as many of such optical elements in an optical train without subsequent degradation of the operativeness of the system is extremely desirable.

Heretofore the elimination of essential optical elements in a tracking or pointing system required the utilization of transmissive optical elements, however, these elements could not be used with high average power lasers.

A fundamental problem with working with high average power laser beams is that all optical elements must be fitted with a heat exchanger to remove the heat generated by an absorption of the laser beam. The necessity of including a heat exchanger in the optical element forces all the optical elements which are impinged by the high average power beam to be mirrors (or more generally non-transmitters). The beam control problem, thus, is hindered by the constraint on the selection of optical elements one can choose to devise an optical system.

Previous technology includes items from two basic categories of devices; that is aperture sharing devices and beam splitters. A device which is strictly an aperture sharing device is set forth in U.S. Pat. No. 3,858,046. With such a device it is possible to transmit a high average power laser beam of one wavelength while collecting radiation in a second wavelength band. This is accomplished by using a nonuniform thickness coating to act as a lens for one wavelength and a mirror for the other wavelength. The coating is thin enough that heat can be adequately transported through the coating to a heat exchanger behind the bottom reflecting element. This method of aperture sharing does not allow beam sampling to simultaneously occur so that the target position and the beam propagation direction cannot be compared to one another.

The buried grating, another aperture sharing device, is just a high efficiency grating that is overcoated with a dielectric. The dielectric is then overcoated with a dichroic filter. The usual system implementation is to choose the dichroic filter so that the surface is reflective for the high power laser wavelength while it is transmissive to the target emission energy. Since the target emission energy is diffracted by the grating, another complimentary buried grating is normally necessary to correct the dispersion introduced by the first buried grating.

There are three beam sampling devices which have been used in the past. The most commonly used is a beam splitter. However, it cannot be utilized in high power applications because of thermal problems. The second device is a hole grating. This device is simply a mirror with fine rectangular array of circular holes. It is merely a screen and is therefore extremely crude. Even the utilization of low efficiency grating rhombs tuned to the laser wavelength have proven to be ineffective. As is therefore clearly seen, a need arises for a more reliable, efficient and economical pointing and tracking laser control system.

SUMMARY OF THE INVENTION

The precision pointing and tracking control system of this invention overcomes the problems set forth hereinabove, by providing for precision pointing of the laser beam. The system of the instant invention permits one to observe and measure, in the same sensor, the propagation direction of the laser beam, while observing and measuring the location of the target.

The principle feature of the control system of this invention is the incorporation therein of a beam sampler in the form of a high efficiency diffraction grating. The diffraction grating is in optical alignment with the beam emanating from a laser source, as well as the target, a sensor and a retroreflector. These elements are kept in constant optical alignment by any conventional reflecting means which receives appropriate signals from the sensor.

During operation, energy from a narrow band laser beam or monochromatic source impinges upon the high efficiency diffraction grating at an angle $\theta_1$, with respect to the normal to the grating. The first order reflection from the source, this is the output beam, is directed to the target at an angle of $\phi_1$, with respect to the normal to the grating, while the zeroeth order reflection from the source is reflected at angle $\theta_2$, with respect to the normal to the grating, to the retroreflector. The retroreflector propagates the beam back upon itself striking the grating at angle $\theta_2$, with respect to the normal to the grating, which is $-\theta_1$. The first order retroreflected beam is directed to a sensor at an angle $\phi_2$, with respect to the normal to the grating. As stated before the direction of propagation of the output beam is given as $\phi_1$. Due to the symmetry of the system of this invention the relationship between $\phi_1$ and $\phi_2$ is $\phi_1 = -\phi_2$. Thus, the sampled beam has the same phase properties as the output beam except for a change of sign. The amplitude properties are also substantially the same. Hence, the sampled beam can be utilized for extracting any desired parameter of the output laser beam.

The fact that $\phi_1 = -\phi_2$ can also be utilized for energy returning from the target. For energy returning from the target the input angle to the grating is precisely $\phi_1$. This means that the sensor lies on the grating zeroeth order of the grating for energy returning from the target. The beauty of such an arrangement is that there is no dispersion in the zeroeth order. Hence, any sensor to view the target can be installed in this location. For wavelengths other than the source wavelength, the efficiency of the zeroeth order increases. Thus, the transmission loss of the grating for the energy returned from the target is substantially less than would be anticipated. However, since only a single beam sampler is required for the entire system, the grating is the only high loss element for both the outgoing and returning path. The combination of a high efficiency grating and a single sensor location as set forth in this invention makes up an extremely flexible optical package.

It is therefore an object of this invention to provide a precision pointing and tracking control system which allows observing and measuring the propagation direction of an electromagnetic beam while observing and measuring the location of the target in the same sensor.

It is another object of this invention to provide a precision pointing and tracking control system which eliminates boresight errors during tracking or pointing operations.

It is a further object of this invention to provide a precision pointing and tracking control system which incorporates elements therein capable of use with very high energy laser sources.

It is still a further object of this invention to provide a precision pointing and tracking control system which is free of dispersion.

It is still another object of theis invention to provide a precision pointing and tracking control system which is economical to produce and which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE DRAWING

The only FIGURE of the drawing is a schematic representation of the precision pointing and tracking control system of this invention.

DETAILED DESCRIPTION OF THE PRREFERRED EMBODIMENT

Reference is now made to the only FIGURE of the drawing which in schematic fashion sets forth the pointing and tracking control system 10 of this invention. System 10 is made up of a source 12 for an electromagnetic beam 14 in conjunction with a high efficiency diffraction grating 16, a retroreflector 18, sensor 20 and means to be set forth in detail hereinbelow for adjusting the optical relationship between the above elements and a target 34.

Source 12 is generally in the form of a high average power laser such as a $CO_2$ laser which produces a laser beam 14 generally in the $10.6\mu$ wavelength range. Beam 14 is optically aligned with a conventional high efficiency diffraction grating 16. Such alignment is performed either by the direct impingement of laser beam 14 upon grating 16 or by the redirection of beam 14 thereon by way of a conventional adjustable reflecting means such as a conventional two axis steering mirror 22 in a manner to be set forth in detail hereinbelow.

Energy in the form of beam 14 from the narrow band or monochromatic source 12 impinges upon grating 16 at angle $\theta_1$ with respect to the normal to grating 16 as illustrated in the drawing. The grating 16 is of an optical configuration such that only a small fraction of beam 14 is diffracted into the zeroeth order (i.e., the reflection if the grating would be replaced by the mirror) and the remaining energy is diffracted into the first order. The energy in the first order illustrated as beam 24 exits the beam control system 10 of this invention as the output beam. It is diffracted at an angle $\theta_1$, with respect to the normal to grating 16.

The energy in the zeroeth order illustrated as beam 26 is transmitted through a conventional attenuator 28 to any conventional retroreflector 18 such as a conventional corner cube, cat's eye or cat's eye with chopper. Although the control system 10 of this invention is operable without attenuator 28, optimum results are obtained with attenuator 28 when source 12 is a high power laser source since attenuator 28 prohibits parasitic oscillations in laser source 12 as well as adjusts the amount of energy focused on sensor 20.

Retroreflector 18 propagates beam 26 back upon itself through attenuator 28 to diffraction grating 16 as beam 30. The retroreflected beam 30 strikes grating 16 with an angle of incidence $\theta_2(-\theta_1)$ with respect to the normal to grating 16. Grating 16 then acts upon beam 30 so that its zeroeth diffracted order is directed back into laser source 12 (not shown). The amount of radiation that reaches laser source 12 is $$P_{retro} = T_1^2 T_2^2 P_{laser}$$

where $P_{laser}$ is the output power of laser 12, $T_1$ is the efficiency of grating 16 in the zeroeth order, and $T_2$ is the transmittance of attenuator 28. $T_2$ is chosen so that $P_{retro}$ is small enough so that parasitic oscillations are not produced. Of course as set forth above, if source 12 is not a laser, attenuator 28 is unnecessary.

The remaining energy in beam 30 returning to grating 16 from retroreflector 18 is diffracted into a first order beam 32.

The energy in beam 32 is given by $$P_{sample} = T_1 T_3 T_2^2 P_{laser}$$

where $T_3$ is the efficiency of grating 16 in the first order. Beam 32 is called the sampled beam. The direction of propagation of sampled beam 32 is given by $\phi_2$ with respect to the normal to grating 16. As set forth above, the direction of propagation of output beam 24 is given by $\phi_1$ with respect to the normal to grating 16. Due to the symmetry of the geometry of system 10 of this invention, the relation between $\phi_1$ and $\phi_2$ is $$\phi_1 = -\phi_2$$

Thus, sampled beam 32 has the same phase properties as output beam 24 except for a change of sign. The amplitude properties are also the same except for the attenuation factor. Hence, sampled beam 32 can be utilized for extracting any desired parameter of the output laser beam 24.

Since $\phi_1 = -\phi_2$ it is relatively simple to establish the energy returning from a target 34. Target 34 gives off black body radiation at a wavelength of, for example, 3–5$\mu$. This radiation designated as beam 36 impinges upon any suitable adjustable reflecting means such as a conventional two axis steering mirror 38. Steering mirror 38 directs beam 36 back to grating 16. Sensor 20 lies not only on the first order for beam 32 from retroreflector 18 but on the zeroeth order of grating 16 for energy in the form of beam 40 returning from target 34. Such an arrangement as set forth in control system 10 of this invention eliminates dispersion in the zeroeth order.

Hence, any sensor to view target 34 can be installed in the location of sensor 20. For wavelengths other than the source wavelength, the efficiency of the zeroeth order increases. Thus, the transmission loss of grating 16 for the energy returned from target 34 is small. Since only a single beam sampler is required for the entire system of the instant invention, grating 16 is the only high loss element for both the outgoing and returning path. Such an arrangement of a high efficiency grating 16 and a single sensor 20 location gives an extremely flexible optical package.

In operation, the pointing and tracking control system 10 of this invention receives energy in the form of beam 36 from a target 34 to be tracked. Beam 36 is directed onto grating 16 by adjustable mirror 38. A signal 42 from sensor 20 to mirror 38 adjusts mirror 38 by any conventional mechanism so that the zeroeth order of beam 36 reflected from grating 16 as beam 42 is centrally positioned on sensor 20. As target 34 moves, sensor 20 emits a signal 42 which adjusts mirror 38 accordingly so that beam 40 maintains its central position, at all times, on sensor 20.

Since $\phi_1 = -\phi_2$, in order to point laser beam 14 on target 34, it is merely necessary to maintain beam 14, in the form of redirected beam 32, in the center of sensor 20. This is accomplished by a signal 44 emanating from sensor 20 in accordance with the position of beam 32. Signal 44 causes any suitable adjustment means on mirror 22 to align beam 14 so that the first order retroreflected beam 32 is centrally located on sensor 20. Therefore, as long as mirror 38 is adjusted in accordance with signal 40 to keep beam 40 centrally located on sensor 20 and $\phi_1 = -\phi_2$, laser beam 14 in the form of output beam 24 will continually be pointed at and track target 34. For purposes of simplicity, sensor 20 which may be in the form of any conventional beam angle sensor, wave analyser or interferometer has a detector therein capable of receiving the wavelengths of both target 34 and laser beam 14. However, control system 10 is also operational with a sensor 20 containing a pair of detectors, one sensitive to only the wavelength of target radiation (3–5$\mu$) and the other sensitive to only the wavelength of laser beam radiation (10.6$\mu$). As long as the angle or phase shape of wavefront of both target 34 and beam 14 are identical when compared within sensor 20, the control system 10 is in complete alignment and the tracking and pointing system of this invention is fully operational.

Although this invention has been described with reference to a particular embodiment, it will be understood to those skilled in the art that this invention is also capable of further and other embodiments within the spirit and scope of the appended claims.

I claim:

1. A precision pointing and tracking control system comprising means for producing an electromagnetic beam, means in optical alignment with said electromagnetic beam for receiving said electromagnetic beam and reflecting therefrom a pair of beams, one of said pair of beams being reflected into the zeroeth order, the other of said pair of beams being reflected into the first order, said first order reflected beam being reflected in the direction of a target, means in optical alignment with said zeroeth order reflected beam for receiving said zeroeth order reflected beam and redirecting said zeroeth order reflected beam back onto said receiving and reflecting means, said receiving and reflecting means reflecting said redirected beam into the first order, means in optical alignment with said redirected first order reflected beam for sensing the presence of said redirected first order reflected beam and comparing the angular relationship of said redirected first order reflected beam with a zeroeth order reflected beam from said target reflected by said receiving and reflecting means and adjustable means optically aligned with said target and said electromagentic beam producing means for aligning said redirected first order reflected beam and said zeroeth order reflected target beam in accordance with signals from said sensing and comparing means.

2. A precision pointing and tracking control system as defined in claim 1 wherein said receiving and reflecting mean comprises a high efficiency diffraction grating.

3. A precision pointing and tracking control system as defined in claim 2 wherein said receiving and redirecting means comprises a retroreflector.

4. A precision pointing and tracking control system as defined in claim 1 wherein said means for producing an electromagnetic beam comprises a laser.

5. A precision pointing and tracking control system as defined in claim 4 further comprising means optically interposed between said receiving and reflecting means and said receiving and redirecting means for prohibiting parasitic oscillations in said laser.

6. A precision pointing and tracking control system as defined in claim 5 wherein said means for prohibiting parasitic oscillations comprises an attenuator.

7. A precision pointing and tracking control system as defined in claim 6 wherein said receiving and reflecting means comprises a high efficiency diffraction grating.

8. A precision pointing and tracking control system as defined in claim 7 wherein said receiving and redirecting means comprises a retroreflector.

9. A precision pointing and tracking control system as defined in claim 8 wherein said sensing and comparing means comprises a beam angle sensor.

10. A precision pointing and tracking control system as defined in claim 8 wherein said sensing and comparing means comprises an interferometer.

* * * * *